United States Patent
Rapistan Incorporated et al.

[11] 3,838,411
[45] Sept. 24, 1974

[54] DETECTION SYSTEM

[75] Inventors: Clayton H. Vander Meer, Wyoming, Mich.

[73] Assignee: Rapistan Incorporated, Grand Rapids, Mich.

[22] Filed: Jan. 2, 1973

[21] Appl. No.: 320,512

[52] U.S. Cl. .............................. 340/310 R, 340/216
[51] Int. Cl. ........................................... H04m 11/04
[58] Field of Search .......... 340/310, 216, 170, 326, 340/416, 213; 178/67; 179/2.5, 170 J

[56] References Cited
UNITED STATES PATENTS

| | | | |
|---|---|---|---|
| 3,388,389 | 6/1968 | Henriques | 340/216 |
| 3,451,052 | 6/1969 | Anderson et al. | 340/310 A |
| 3,458,657 | 7/1969 | Lester et al. | 340/310 A |
| 3,460,121 | 8/1969 | Wattenburg | 340/310 A |

Primary Examiner—John W. Caldwell
Assistant Examiner—Richard P. Lange
Attorney, Agent, or Firm—Price, Heneveld, Huizenga & Cooper

[57] ABSTRACT

A system for detecting objects or predetermined conditions at remote locations employs a control circuit coupled to a remote sensor circuit by two conductors to supply power to the sensor circuit during the positive half of each cycle. During the negative half of the cycle of operation, the remote sensor circuit develops an output signal indicating the presence or absence of an object or other detected condition and applies the signal to the control circuit via the same two conductors. The control circuit responds to the signal from the sensor circuit to provide an output signal for actuating a control related to the detected condition.

14 Claims, 3 Drawing Figures

DETECTION SYSTEM

BACKGROUND OF THE INVENTION

The present invention relates to detection systems particularly to a system employing remote sensing units coupled to a control circuit.

In many control system applications, it is desired to detect the presence or absence of a predetermined condition at a remote location. In conveyor systems for example, it is frequently desired to detect the passage of an article on a conveyor line at a given location. To achieve this, frequently photoelectric or other sensing units are positioned at spaced intervals along the conveyor line to provide signals reflecting the movement of an article along the conveyor. The signals so developed can be employed to divert the articles, control the speed of the conveyor, or control other functions desired in operating the system.

When several remote sensors are employed in a control system, generally a centrally located master control is provided to which each of the remote sensors is coupled. The master control may include a central electrical control circuit for the conveyor system and frequently includes an operating console for providing visual signals to an operator. In many installations, it is necessary to interconnect a plurality of remote sensors spaced along a conveyor to such a master control which requires relatively lengthy interconnecting conductors.

Typically, the master control provides power to the remote sensors as well as receives lintelligence carrying signals from them. Thus, an installation requires a common conductor interconnecting the master control with each of the sensors, a power supply conductor for providing power to the remote sensors, and a signal carrying conductor for receiving information from each of the remote sensors. In some instances, more than the minimum three lines are required when interconnecting the remote sensors to the master control.

The use of at least three, and frequently more conductors interconnecting the master control with each of the remote sensors can become quite costly due to the cost of multiple conductor interconnecting cables. If the power supplying conductors are eliminated, each remote sensor must be individually powered by its own power supply thereby increasing the cost of the installation. In such event, at least two signal carrying conductors are still required for interconnecting the sensors with the master control.

It is desired, therefore, to provide a system whereby a master control can provide operating power for one or more remote sensing units and receive signals therefrom with a minimum of interconnecting wires and with inexpensive control circuits. The use of RF interconnection links between the master control and each remote sensor could be utilized. An RF transmission link between the master control and the sensing units, however, requires each sensor to have its own receiver and transmitter. The cost of such a system can be prohibitive in installations where several sensors are employed. Also, in many installations where steel construction exists, the propagation of signals between the master control and remote sensors is frequently impossible or at best unreliable.

One system employing a pair of lines for transmission of power and information on the same pair of lines is described in U.S. Pat. No. 3,451,052 issued to S. W. Garrett on Mar. 10, 1970. The system described in this patent employs a direct current power source whereby information is transferred between a control station and a remote sensor by opening or closing a continuity path therebetween aperiodically and as a function of the conditions detected by the sensor. Although such a system may be useful in the particular control suggested in this patent, it lacks the flexibility necessary for use in complex control systems and cannot, due to limitations inherent in its design, be used in many such applications.

SUMMARY OF THE INVENTION

The system of the present invention employs a control circuit coupled to one or more remote sensing circuits by a pair of conductors. During one half of each cycle, power is supplied to the sensing circuit while during the remaining half cycle, information is returned to the control circuit from the sensing circuit. The system, therefore, interrogates the remote sensor periodically and at intervals related to the frequency of excitation current employed. Such a system can provide instantaneous information as to rapidly changing conditions sensed by the sensing circuit.

Systems embodying the present invention include a control circuit coupled to a sensing circuit by means of a pair of conductors. The control circuit includes means for supplying current during one half cycle of each cycle of the excitation current to provide the operating power for the sensing circuit and means for receiving a signal from the sensing circuit during the remaining half cycle of the excitation current. The sensing circuit includes means for detecting a predetermined condition and for applying a signal representative thereof to the conductors during alternate half cycles of each cycle.

It is an object of the present invention, therefore, to provide an improved system for detecting conditions at remote locations.

An additional object of the present invention is to provide a control circuit coupled to a remote sensing circuit to alternately supply power to the remote sensing circuit and receive information therefrom during periodically alternating half cycles of operation employing only two interconnecting conductors.

An additional object of the present invention is to provide a sensing circuit which is responsive to half cycles of power supply current to supply power to the circuit elements therein which provide information bearing signals during alternate half cycles of operation.

These and other objects of the present invention will become apparent upon reading the following specification together with the accompanying drawings in which:

DETAILED DESCRIPTION OF THE PREFERRED EMBODIMENT

Figure 1:
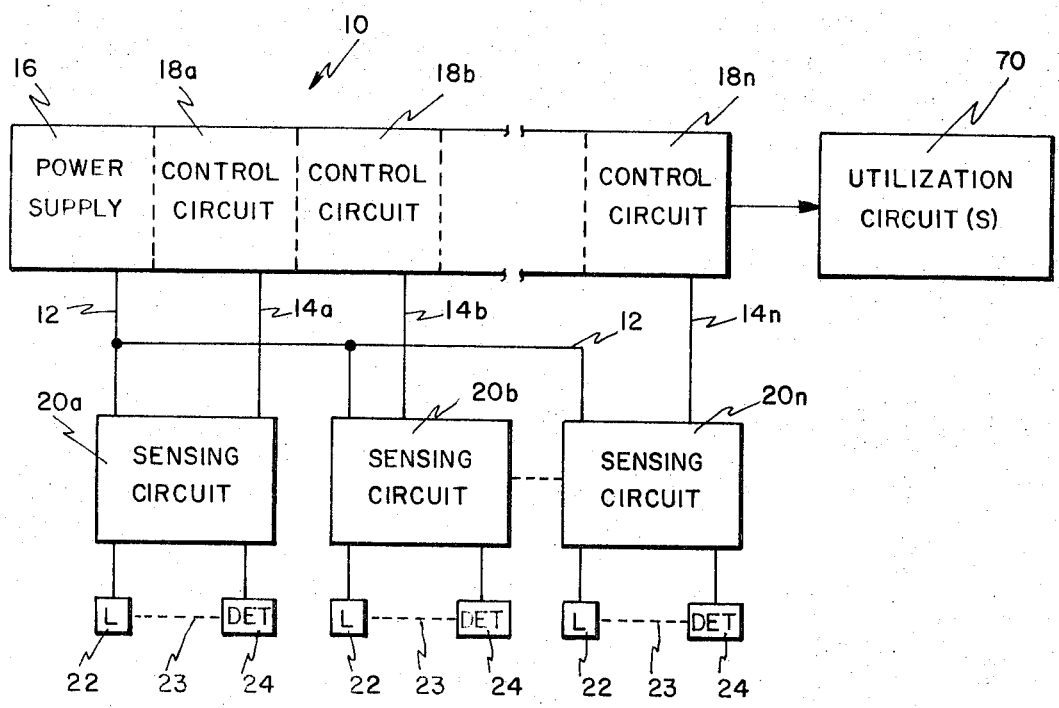
FIG. 1 is an electrical circuit diagram in block form illustrating one embodiment of the present invention.

Referring now to FIG. 1, there is shown a master control circuit 10 which is interconnected to a plurality of remote sensing circuits 20. Any number of sensing circuits can be employed. In the system shown, 14 are used with only the first two and the last one being shown and identified as 20a, 20b and 20n. The master control is interconnected to each individual sensing circuit by a pair of conductors labeled 12 and 14 in the figure. Conductor 12 is common to each of the remote sensing circuits 20 while conductor 14 interconnects each of the sensing circuits to the master control circuit separately. Conductors 14 are identified in the figure by the suffixes corresponding to the sensor to which they are coupled. The master control circuit 10 includes a power supply 16 and a plurality of individual control circuits 18, each being electrically coupled to the power supply and each having a single conductor 14 coupled between the individual control circuit and the corresponding sensing circuit therefor.

Each of the sensing circuits 20 includes sensing means which, in the embodiment shown, comprises a light source 22 and a detector 24 comprising light responsive means spaced from the source such that the optical path 23 therebetween can be interrupted by an object to be detected. Although the preferred embodiment is illustrated as sensing the passage of an object between the light source and light responsive means, the sensing means can comprise any suitable sensor for detecting any particular condition desired to be detected. Thus, for example, the sensing circuit can sense pressure, temperature, humidity or other physical characteristics.

The master control and sensing circuit of the preferred embodiment are employed in a conveyor system (not shown) such that as an object moves along a predetermined location of the conveyor, it intercepts the light beam between the source and detector. The circuit provides a signal which can be applied to a utilization circuit 70 suitably coupled to the master control 10 to provide a desired control function as for example, diverting the detected article from the conveyor. It is readily apparent that other control functions such as labeling, etc., can similarly be controlled using the circuit of the present invention.

Master control 10 supplies power to the remotely positioned sensor during one half cycle of each of the periodic cycles of operation. This power activates the circuits 20 as well as the sensing means associated therewith. During the remaining one half cycle of each cycle of operation, information bearing signals are received by the control circuits from the interconnected sensing circuit. The unique circuitry which permits this interaction between the control and sensing circuits using only two interconnecting conductors is described with reference to FIGS. 2 and 3.

Figure 2:
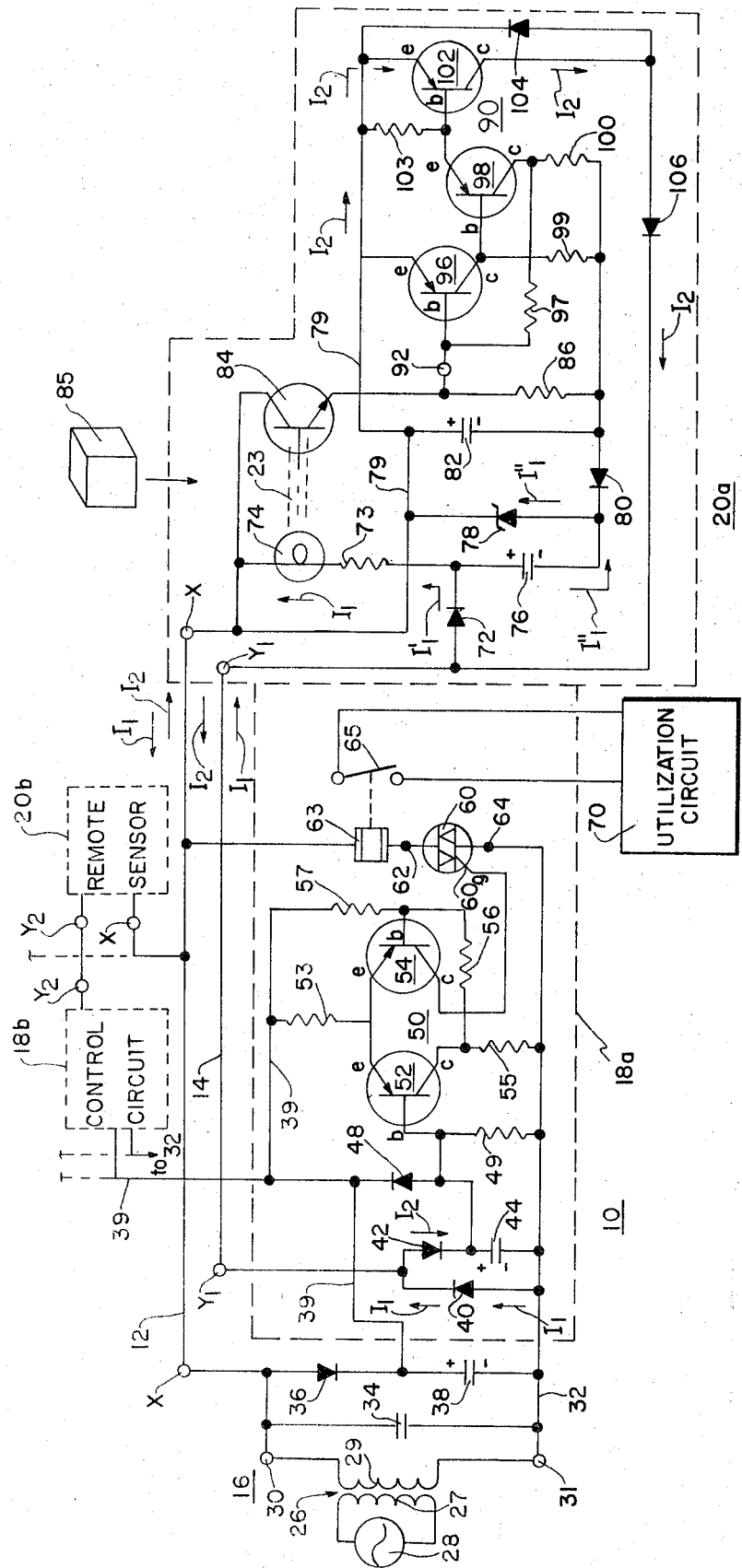
FIG. 2 is an electrical circuit diagram in schematic form of the power supply and one of the control circuits and sensing circuits shown in FIG. 1.

Referring now to the circuit diagram of FIG. 2 which shows a portion of the master control unit 10 and one of the sensing circuits 20 in detail, it is seen that the power supply 16 includes a power transformer 26 with a primary winding 27 coupled to a source 28 of alternating electrical current. The secondary 29 of transformer 26 has a first terminal 30 coupled to common conductor 12 interconnecting the master control with the sensing circuits. A second terminal 31 on the opposite end of secondary winding 29 is coupled to a conductor 32 forming a common bus line for the control circuits 18.

A noise suppression capacitor 34 is coupled in parallel with the transformer secondary. Also coupled across the secondary of transformer 26, is a half wave rectifier circuit comprising the series combination of a diode 36 and filter capacitor 38. Capacitor 38 is charged in the polarity shown and current from the junction of diode 36 and capacitor 38 supplies the D.C. operating current for circuits 18 via a supply bus 39. Conductor 39 extends to each of the control circuits 18 within master control 10.

Control circuit 18a which is identical to the remaining control circuits of the master control, includes a first current steering diode 40 having an anode terminal coupled to conductor 32 and a cathode terminal coupled to interconnecting conductor 14a to provide power supplying current which flows in a direction indicated by the arrows accompanied by the symbol $I_1$ in the figure. A second current steering diode 42 has an anode coupled to conductor 14a and a cathode coupled to a series connected capacitor 44 having its terminal remote from diode 42 coupled to conductor 32. Diode 42 permits signal current indicated by the symbol $I_2$ to flow therethrough in a direction indicated by the accompanying arrow.

The junction of diode 42 and capacitor 44 is coupled to the base terminal 52b of a transistor 52 forming a portion of a Schmitt trigger circuit 50. As described below, current $I_2$ changes capacitor 44 to trigger circuit 50. Also coupled to base terminal 52b is the anode of a diode 48 having a cathode coupled to the supply bus 39. A resistor 49 is coupled between base terminal 52b and conductor 32.

The Schmitt trigger includes a second transistor 54 having base, collector and emitter terminals 54b, 54c and 54e respectively. Emitter terminals 52e and 54e of transistors 52 and 54, respectively, are commonly coupled and their junction is coupled to the supply bus 39 through a resistor 53. Resistor 55 couples the collector terminal 52c of transistor 52 to conductor 32. Terminal 52c is also coupled to base terminal 54b of transistor 54 by means of a resistor 56. Base terminal 54b is further coupled to supply line 39 by means of a resistor 57.

The collector terminal 54c of transistor 54 provides an output signal which is applied to a gate terminal 60g of a voltage responsive switch 60 comprising a triac. Triac 60 has a first terminal 62 coupled to the interconnecting conductor 12 by means of a control relay 63 and a second output terminal 64 coupled directly to bus line 32. When the triac is actuated by the output signal from the Schmitt trigger circuit to be rendered conductive during the interrogation portion of each cycle of operation, as described below, the control relay is actuated and closes relay contacts 65 which in turn supplies an electrical signal to a utilization circuit 70.

Circuit 70, as noted earlier, can be any desired utilization circuit for providing a control function for the conveyor system in which the detection circuit is employed. Thus, for example, the utilization circuit may be a conventional diverting mechanism control actuated by relay contacts 65 to divert an article from the conveyor once it is detected at a predetermined position therealong. When the detection circuit is employed for other applications, the control function of circuit 70 is varied as required by the particular application.

Sensing circuit 20a is interconnected to master control 10 and the associated control circuit 18a therein by means of terminals of terminals X—X and $Y_1$—$Y_1$ and interconnecting conductors 12 and 14a. Terminal $Y_1$ coupled to conductor 14a is coupled to the anode terminal of a third current steering diode 72. The cathode terminal of diode 72 is coupled to the junction of a resistor 73 and a capacitor 76. The terminal of resistor 73 remote from this junction is coupled to a light source 74 having a remaining terminal coupled to conductor 12 via terminal X. The terminal of capacitor 76 remote from its junction with resistor 73 is coupled to the junction of diodes 78 and 80.

Diode 78 is a Zener diode which has its cathode terminal coupled to a common line 79 in turn coupled to line 12 by means of terminal X of circuit 20a. The anode terminal of diode 80 is coupled to one terminal of a capacitor 82 having its terminal remote therefrom coupled to conductor 79. As will be described hereinafter, diodes 78, 80 and capacitor 82 serve to supply operating power for actuating an amplifier circuit 90 during at least a portion of each operating cycle of the unit.

Amplifier 90 has an input terminal 92 which receives signals developed across a resistor 86 having one terminal coupled to the anode of diode 80 and a remote terminal coupled to the emitter of a phototransistor 84. The collector of transistor 84 is coupled to terminal X. Light 74 and phototransistor 84 may be physically positioned along a conveyor line, for example, such that an object 85 moving along the conveyor traverses the light path 23 between the devices. The installation may include a reflective target on one side of the conveyor with elements 74 and 84 on the opposite side. When the light path is interrupted momentarily by the object, the conductivity of the phototransistor 84 increases to provide a signal as described below under the heading OPERATION.

The signal from transistor 84 is applied to input terminal 92 of amplifier 90 which includes an input PNP transistor 96 having a base terminal 96b coupled to input terminal 92, an emitter terminal 96e coupled to line 79 and a collector terminal 96c coupled directly to a base terminal 98b of a second PNP transistor 98. The collector terminal 98c of transistor 98 is coupled to the base of transistor 96 by means of a coupling resistor 97. The junction of collector terminal 96c with base terminal 98b is coupled to the anode of diode 80 by means of a resistor 99. The collector terminal of transistor 98 is also coupled to the anode of diode 80 by means of a resistor 100.

Emitter terminal 98e of transistor 98 is coupled directly to a base terminal 102b of transistor 102 which is further coupled to line 79 by means of a resistor 103. Emitter terminal 102e of transistor 102 is coupled directly to line 79. A diode 104 is coupled between the collector 102c and emitter terminal 102e of transistor 102 in a direction to protect the transistor from reverse break-over. The collector terminal 102c of transistor 102 is additionally coupled to the anode terminal of a fourth current steering diode 106 having a cathode terminal coupled to terminal $Y_1$ of circuit 20a. Having briefly described the control and sensing circuits, a description of a cycle of operation of the circuit is now presented with reference to FIGS. 2 and 3.

OPERATION

Figure 3:
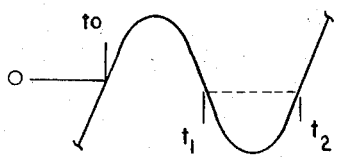
FIG. 3 is an electrical waveform diagram of the voltage between the two interconnecting conductors during a single cycle of operation.

FIG. 3 shows the voltage of line 14 with respect to line 12 during the first half of each operating cycle ($t_0$-$t_1$) during which power is supplied to the remote sensing circuit and during the second half cycle ($t_1$-$t_2$) of each cycle of operation during which information is transferred between the units. The dashed line portion between $t_1$ and $t_2$ illustrates the condition where light is falling upon detector 84 whereas the solid line portion indicates that an object 85 is intercepting the light beam. Although a sinusoidal 60 Hz excitation signal is employed in the preferred embodiment, any suitable periodically reversing polarity signals may likewise be used. The D.C. reference of the excitation signal also need not be zero as illustrated in FIG. 3.

Between $t_0$ and $t_1$, terminal 31 of power transformer 26 is positive with respect to terminal 30 and diode 40 is forward biased to conduct current $I_1$ along conductor 14 as seen in the diagram. Current $I_1$ flows into terminal $Y_1$ of sensing circuit 20a and through forwardly biased diode 72. At the cathode of diode 72, current $I_1$ splits into components $I_1'$ and $I_1''$. Component $I_1'$ flows through the series coupled resistor and light source 73 and 74, respectively, to illuminate lamp 74. Component $I_1''$ flows into capacitor 76 to charge it in the polarity indicated and thence through the forwardly biased Zener diode 78 to return line 12. It is noted here that diode 78 is in its forward biased conduction state during the first half cycle of operation to clamp the negative side of capacitor 76 to the conductor 79. During the remaining half cycle, however, diode 78 is operated in its avalanche mode of operation to regulate the voltage across supply capacitor 82.

Thus, it is seen that during the power supply half cycle of each cycle of operation, current flows through the first and third current steering diodes to charge capacitor 76 and illuminate lamp 74. During the last half cycle, when diodes 40 and 72 are again reverse biased, the polarity of terminal 31 to 30 reverses as seen during the interval $t_1$-$t_2$. Capacitor 76 supplies sufficient current to lamp 74 to keep it illuminated and permit the sensing of an object intercepting light beam 23. Capacitor 76 also supplies current to power supply capacitor 82 (through diode 80) which in turn provides operating current for amplifier 90.

In the event that the light beam is not interrupted, the resistance of phototransistor 84 is decreased by light falling on a light responsive surface thereof and applies the positive going signal on conductor 12 to the input terminal 92 of amplifier 90. This signal turns off transistor 96 which increases the base drive to transistor 98 which is in turn rendered conductive as is output transistor 102.

With transistor 102 conducting, a current $I_2$ flows from the emitter to collector of the PNP transistor, as indicated in the diagram, and through the forwardly biased fourth current steering diode 106 and in interconnecting line 14 through interconnected terminals $Y_1$ between the circuits.

Current $I_2$ passes through the forwardly biased second current steering diode 42 to provide a positive going signal across capacitor 44 which turns off transistor 52. Transistor 54 is rendered conductive thereby turning on triac 60. The A.C. relay 63 is then rendered conductive to hold the switch 65 in a closed position. It is noted here that relay 63 could likewise have a normally closed switch which is opened by the actuation of triac 60. Thus, when no object is sensed, triac 60 is conductive to provide a first signal to the utilization circuit 70 (during $t_1-t_2$) by means of the closure of switch contacts 65.

When, however, during the second portion of each operating cycle (i.e., $t_1-t_2$), an object interrupts the light beam momentarily, the resistance of device 84 increases to prevent the actuation of output transistor 102 of amplifier 90 thereby preventing the generation of signal current $I_2$. As seen in FIG. 3 in solid lines, no signal is present across conductors 12 and 14 and Schmitt trigger 50 is not triggered to turn on triac 60. Relay 63, therefore, will be inactivated since triac 60 switches off. Since triac 60 is not conductive, switch contacts 65 of relay 63 move from their closed position to the normally open position of the relay as shown. This provides an electrical signal which can be employed to control the utilization circuit as noted earlier by, for example, diverting an article or the like.

The system includes several additional control circuits and associated sensing circuits as indicated by the dashed line portion of FIG. 2. The amplifier in the sensing circuit, as well as the Schmitt trigger in the control circuit, can be replaced with equivalent circuits for performing the desired functions. It is important to note that sufficient current flows from capacitor 76 into light 74 which together with the thermal delay of the lamp, maintains the lamp in an illuminated condition during the second portion of each operating cycle where the sensing operation takes place.

Due to the sinusoidal nature of the energizing waveform, it will be apparent that the various steering diodes may not be conductive during the entire interval of each half cycle of operation but may be conductive for a shorter or a greater period depending upon the circuit elements employed, as well as the nature of the object being detected. The power supplying capacitor 82 for the amplifier 90, as well as the charge storage device 76, charge sufficiently during a very few cycles of operation to provide power for the circuits. This permits a single control circuit to be employed with a plurality of sensing circuits, if desired, by selectively coupling the sensing circuits and utilization circuits in a synchronous manner to the control circuit.

It will become apparent to those skilled in the art that various other modifications to the present invention can be made. Such modifications may, for example, include the actuation of the system with frequencies above or below the conventional 60 Hz line frequency signals and substituting other detecting means for the optical detectors. Different waveform signals such as square waves, composite signals, etc., can likewise be employed. Circuit changes can be made if equivalent to the circuit elements shown. These and other modifications to the present invention will, however, fall within the scope and spirit of the invention as defined in the appended claims.

The embodiments of the invention in which an exclusive property or privilege is claimed are defined as follows:

1. A sensor system comprising:
   generating means for generating control signals;
   supply means for providing periodic electrical energy carrying signals;
   sensing means including means for detecting predetermined conditions at a position remote from said generating means and developing signals representative of a detected condition; and
   circuit means for coupling said supply means to said sensing means to apply said periodic signals to said sensing means for supplying operating power thereto during only a portion of an operating cycle and for coupling signals from said sensing means and representative of a detected condition to said generating means only during a different portion of an operating cycle.

2. The system as defined in claim 1 wherein said sensing means includes charge storage means coupled to said circuit means for receiving and storing electrical energy from the signals from said supply means.

3. The system as defined in claim 2 wherein said sensing means includes an amplifier coupled to said detecting means to provide information bearing output signals in response to signals from said detecting means and coupled to said charge storage means for receiving operating power therefrom.

4. The system as defined in claim 3 wherein said detecting means includes a light source and light responsive means coupled to said charge storage means for receiving operating power therefrom.

5. The system as defined in claim 4 wherein said light source and light responsive means are spaced from one another to provide an interruptable light path therebetween.

6. The system as defined in claim 1 wherein said circuit means includes a pair of conductors interconnecting said supply and generating means and said sensing means.

7. The system as defined in claim 6 wherein said circuit means further includes unidirectional conduction means coupled in series with said conductors and selectively conductive for coupling said periodic signals to said sensing means and coupling signals from said sensing means to said generating means.

8. A method of providing operating power to a remote position and receiving information bearing signals therefrom using only two interconnecting conductors comprising the steps of:
   providing periodic power signals;
   positioning a sensing circuit remote from a control circuit;
   interconnecting said sensing circuit to said control circuit with two current paths;
   applying said power signals to said sensing circuit only during a portion of each cycle of operation; and
   applying information bearing signals from said sensing circuit only to said control circuit during a different portion of each operating cycle.

9. A sensor system for alternately applying power to a remote sensor from a control circuit and receiving information bearing signals therefrom comprising:
   providing means for providing periodic energy carrying signals having a first characteristic during a first half cycle and a second characteristic during a second half cycle of each cycle of operation;
   remote sensing means spaced from said providing means;
   coupling means for coupling said providing means to said remote sensing means during each first half cycle of operation, said remote sensing means including a sensor circuit receiving operating power from said providing means during each first half cycle of operation;

a control circuit for developing control signals responsive to a condition detected by said sensing means; and additional coupling means for coupling said sensor circuit to said control circuit during the second half cycle of a cycle of operation to transfer information bearing signals therebetween.

10. The system as defined in claim 9 wherein said coupling means and additional coupling means include a pair of conductors extending from said providing means and said control circuit to said sensing means, and at least two unidirectional conductive devices serially coupled to one of said conductors and poled to apply signals having a first characteristic to said remote sensing means during said first half cycle of each operating cycle and to apply information bearing signals having a second characteristic to said control circuit during said second half cycle of each operating cycle.

11. The system as defined in claim 10 wherein said first characteristic is a first polarity and said second characteristic is a second polarity and wherein said unidirectional conductive devices comprise current steering diodes for permitting electrical supply current to flow from said providing means to said sensing means during said first half cycle and for permitting electrical signal current to flow from said sensing means to said control circuit during said second half cycle of operation.

12. The system as defined in claim 11 wherein said sensing circuit includes a light source, a light responsive device spaced from said light source and charge storage means coupled to said light source, to said light responsive device and to said coupling means for receiving and providing operating power to said sensing circuit.

13. The system as defined in claim 12 wherein said sensing circuit further includes an amplifier coupled to said light responsive device to provide output signals representative of detected information therefrom and to said charge storage device for receiving operating power therefrom.

14. The system as defined in claim 13 wherein said control circuit comprises:

a trigger circuit having an input terminal coupled to said additional coupling means and an output terminal;

a voltage responsive switch having a control terminal coupled to said output terminal of said trigger circuit; and a control relay serially coupled to said voltage responsive switch to provide an output signal in response to the actuation of said voltage responsive switch.

* * * * *